United States Patent [19]
Lange et al.

[11] Patent Number: 6,137,833
[45] Date of Patent: Oct. 24, 2000

[54] PROGRAMMABLE TRANSMITTER BASEBAND EQUALIZER

[75] Inventors: Julius Lange, Cupertino; Frank Chethik, Palo Alto, both of Calif.

[73] Assignee: Lockheed Martin Corporation, Bethesda, Md.

[21] Appl. No.: 09/420,980

[22] Filed: Oct. 20, 1999

[51] Int. Cl.[7] .............................. H03H 7/30; H03H 7/40; H03H 5/159
[52] U.S. Cl. .......................................... 375/234; 375/235
[58] Field of Search .................................. 375/234, 235, 375/302, 308

[56] References Cited

U.S. PATENT DOCUMENTS 4,613,976  9/1986  Sewerinson et al. .................... 375/279
5,157,693  10/1992  Lemersal, Jr. et al. ................. 375/308
5,534,828  7/1996  Okada et al. ............................ 332/103

*Primary Examiner*—Don N. Vo
*Assistant Examiner*—Phuong Phu
*Attorney, Agent, or Firm*—Kenneth W. Float

[57] ABSTRACT

A transversal filter equalizer comprising a programmable transmitter baseband equalizer for use in high rate digital transmitters. The programmable transmitter baseband equalizer processes digital data using a ½-symbol spaced transversal filter to produce I and Q baseband signals. The ½-symbol spaced transversal filter comprises I and Q n-bit wide shift register stages having alternate pairs of I and Q shift register stages driven by opposite phases of an input data clock, multiplying digital-to-analog converters driven by two direct tap weights and two cross tap weights, and I and Q combiners for generating I and Q baseband signals. The I and Q baseband signals are fed to a quadrature modulator that produces the desired constellation.

11 Claims, 4 Drawing Sheets

PROGRAMMABLE TRANSMITTER BASEBAND EQUALIZER

BACKGROUND

The present invention relates generally to transversal filter equalizers, and more particularly, to an improved programmable transmitter baseband equalizer.

High rate digital communications systems, such as those that employ digital transmitters, are prone to distortion and intersymbol interference. Conventional baseband and passband transversal filter equalizers have been developed to minimize these problems. However, no conventional equalizer has been developed that uses clocked time delays having a ½ symbol period combined with continuously adjustable analog tap weights.

It is an objective of the present invention to provide for an improved programmable transmitter baseband equalizer that overcomes the limitations of conventional baseband and passband transversal filter equalizers.

SUMMARY OF THE INVENTION

To accomplish the above and other objectives, the present invention provides for a new type of transversal filter equalizer for use in high rate digital transmitters, referred to as a programmable transmitter baseband equalizer. The programmable transmitter baseband equalizer takes digital data and feeds I and Q baseband signals to a quadrature modulator. Thus the programmable transmitter baseband equalizer performs the functions of both a constellation shaper and a ½-symbol spaced transversal filter.

More particularly, the programmable transmitter baseband equalizer processes digital data using the ½-symbol spaced transversal filter to produce I and Q baseband signals. The ½-symbol spaced transversal filter comprises I and Q n-bit wide shift register stages having alternate pairs of I and Q shift register stages driven by opposite phases of an input data clock, multiplying digital-to-analog converters driven by two direct tap weights and two cross tap weights, and I and Q combiners for generating I and Q baseband signals. The I and Q baseband signals are fed to a quadrature modulator, which in turn generates the desired constellation.

The programmable transmitter baseband equalizer may be used with simple modulation schemes such as QPSK, SQPSK and MSK, as well as higher order modulation schemes. The programmable transmitter baseband equalizer can be quickly and remotely reprogrammed for a different modulation or continually readjusted for changing conditions. Furthermore, the clock of the incoming data sets the tap delays, so that the equalizer is an all-rate circuit.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
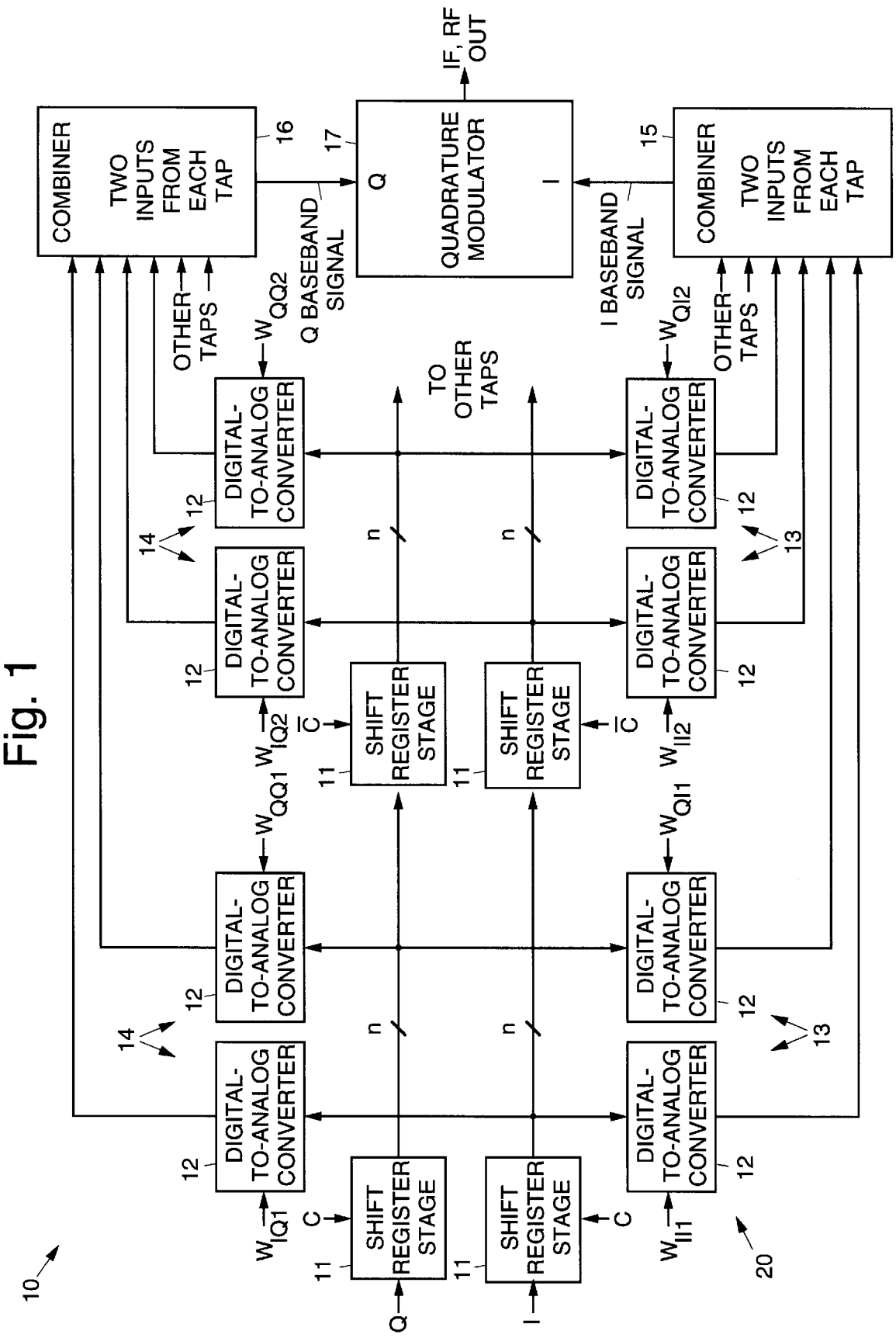
FIG. 1 illustrates a block diagram of an exemplary programmable transmitter baseband equalizer in accordance with the principles of the present invention.

Referring to the drawing figures, FIG. 1 illustrates a block diagram of an exemplary programmable transmitter baseband equalizer 10 in accordance with the principles of the present invention. The programmable transmitter baseband equalizer 10 comprises a plurality of serially coupled I and Q n-bit wide shift register stages 11. The first I and Q n-bit wide shift register stages 11 receive I and Q n-bit wide data streams, respectively, which are coupled to the remaining shift register stages 11. The I and Q n-bit wide shift register stages 11 also receive an input data clock (C). The data symbols are encoded by the I and Q n-bit wide data streams. Alternate pairs of I and Q shift register stages 11 are driven by opposite phases of the input data clock. Therefore, each I and Q shift register stage 11 provides a delay of ½ symbol period.

Each of the I and Q n-bit wide shift register stages 11 are respectively coupled to two n-bit, four-quadrant multiplying digital-to-analog converters 12 comprising I and Q taps 13, 14. Each of the digital-to-analog converters 12 also receive individually programmable and continuously adjustable analog tap weights (W).

More particularly, the digital-to-analog converters 12 are driven by two direct tap weights $W_{QQ}$, $W_{II}$, and two cross tap weights $W_{QI}$, $W_{IQ}$. Thus the plurality of sets of I and Q shift register stages 11 and multiplying digital-to-analog converters 12 implement a ½-symbol spaced transversal filter 20.

Outputs of the multiplying digital-to-analog converters 12 are respectively input to I and Q combiners 15, 16. Two inputs derived from each tap 13, 14 are input the respective I and Q combiners 15, 16. Outputs of the I and Q combiners 15, 16 comprise I and Q analog baseband signals that are input to a quadrature modulator 17. The quadrature modulator 17 outputs intermediate frequency (IF) or radio frequency (RF) signals, thereby generating the desired constellation.

The quadrature modulator 17 is a generic microwave system component, well known to those skilled in the art. It accepts two analog baseband signals I and Q and a local oscillator signal, LO, to produce an intermediate frequency (IF) or radio frequency (RF) signal.

In operation, the programmable transmitter baseband equalizer 10 is able to generate an array of up to $2^n \times 2^n$ constellation points. The incoming data symbols are encoded by two n-bit wide data streams Q and I, which feed the shift register stages 11 that provide the required tap delays. Alternate shift register stages 11 are driven by opposite phases of the input data clock, C, so each shift register stage 11 provides a delay of ½ symbol period.

The shift register stages 11 feed the n-bit wide four-quadrant multiplying digital-to-analog converters 12. There are four digital-to-analog converters 12 per tap, driven by the two direct tap weights $W_{QQ}$, $W_{II}$, and two cross tap weights $W_{QI}$, $W_{IQ}$. The outputs of the multiplying digital-to-analog converters 12 are summed in the I and Q combiners 15, 16, which feed the quadrature modulator 17 with an output at either IF or RF. The programmable transmitter baseband equalizer 10 may also be used to compensate for quadrature and amplitude errors in the quadrature modulator 17 and nonlinearities in the multiplying digital-to-analog converters.

Figure 2:
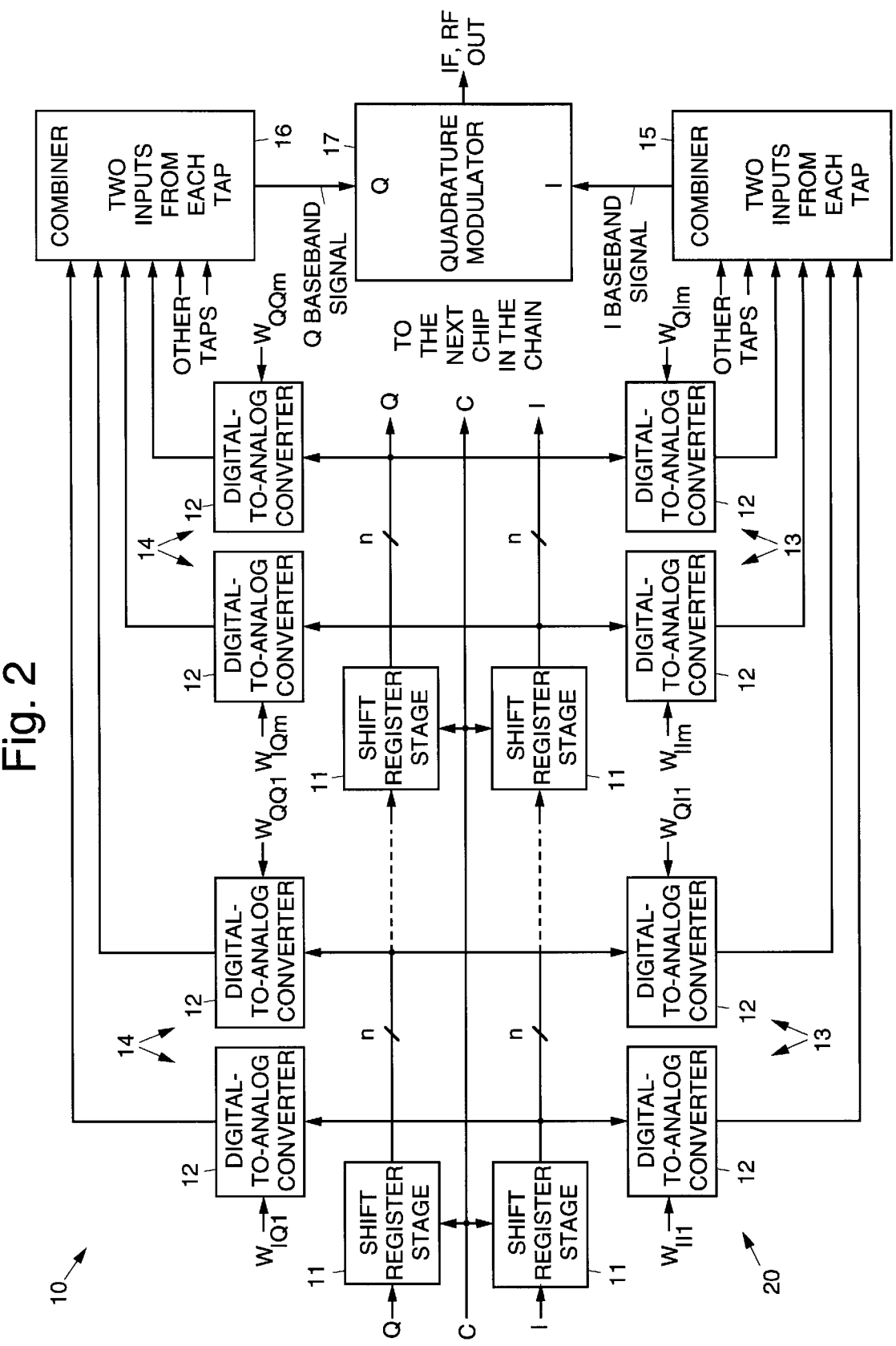
FIG. 2 illustrates a plurality of chained programmable transmitter baseband equalizer integrated circuits.

It is intended to implement the programmable transmitter baseband equalizer 10 as a single-chip medium-scale GaAs monolithic microwave integrated circuit (MMIC) with the quadrature modulator 17 implemented as a separate circuit. Also, two or more programmable transmitter baseband equalizer chips may be combined to provide additional taps, as shown in FIG. 2.

The digital-to-analog conversion function may be implemented in one of two approaches, depending on how the tap weights are scaled. In the first approach, the highest significant bit, HSB, is given the full tap weight, $W_{QQ}$, the next bit is given ½ $W_{QQ}$, and so forth. In addition tap weight $W_{QQ}$ may be set equal to $W_{II}$, and $W_{QI}$ may be set equal to $-W_{IQ}$.

Another approach is to independently control each bit. This requires more analog control inputs, but provides more flexibility in two ways. Since the grid spacing can be nonuniform, more constellations can be accommodated with fewer bits. For example 8PSK can be acconmmodated with two I and two Q bits. if the HSB=1 and the LSB= $\sqrt{2}-1=0.414$. Also, the bits of each digital-to-analog converter 12 may be individually adjusted to compensate for nonlinearities.

Figure 3:
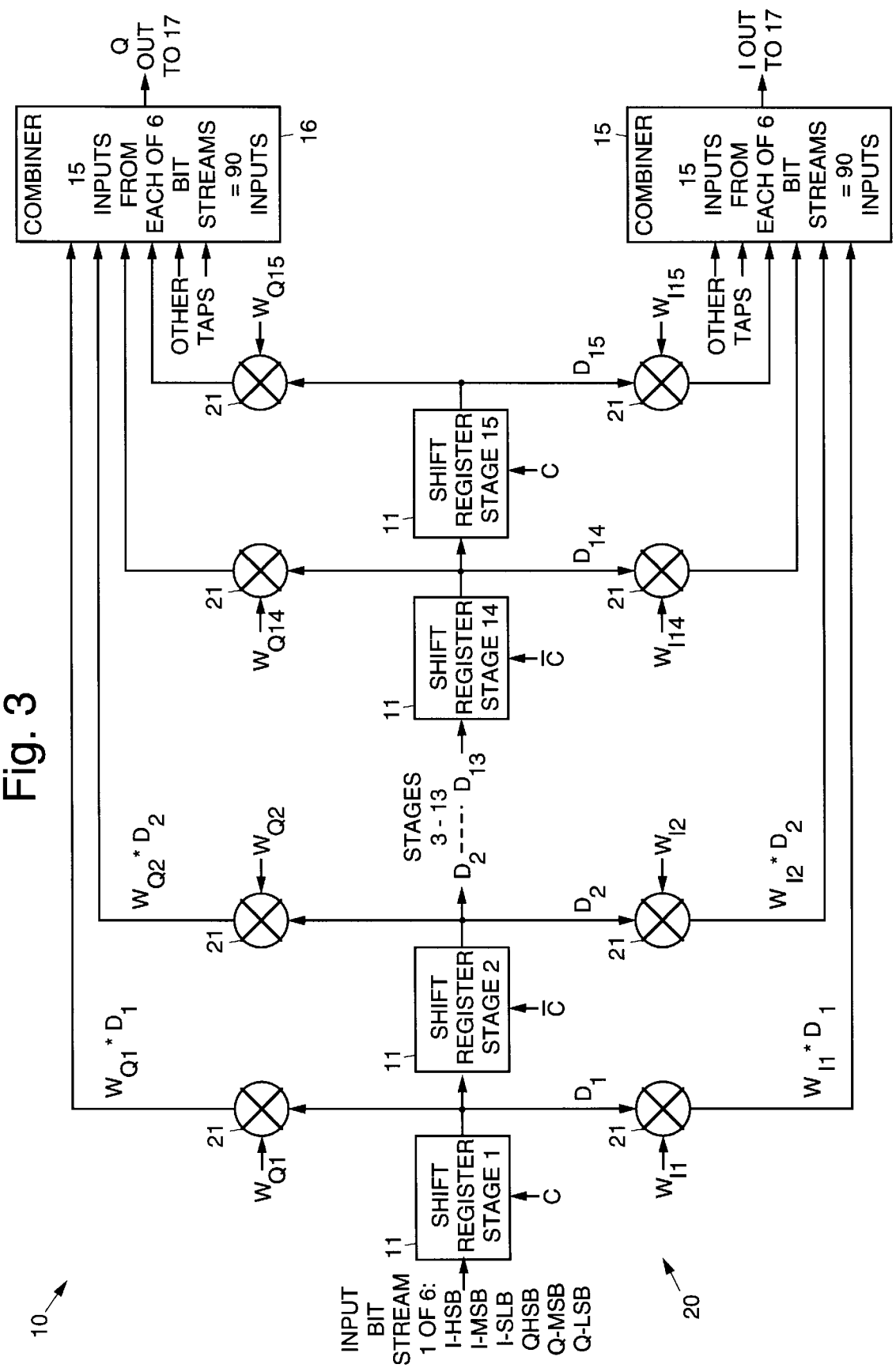
FIG. 3 illustrates an exemplary 15 tap ½-symbol spaced programmable transmitter baseband equalizer.

As a more specific example, a 15-tap ½ symbol spaced programmable transmitter baseband equalizer 10 is shown in FIG. 3. The programmable transmitter baseband equalizer 10 of FIG. 3 can accommodate up to 6 bits per symbol, supporting modulations such as QPSK, SQPSK, 8PSK, 16QAM, 32QAM, and 64QAM. Modulations such as MSK can also be supported, if the quadrature modulator 17 is equipped to implement bit shaping.

For simplicity and clarity, FIG. 3 shows only one of the six input bit-streams, which correspond to the six bits of each symbol: I-HSB (Highest Significant Bit), I-MSB (Medium Significant Bit), I-LSB (Lowest Significant Bit), Q-HSB (Highest Significant Bit), Q-MSB (Medium Significant Bit), Q-LSB (Lowest Significant Bit). Six shift register stages 11, each driven by one bit-stream, provide the required tap delays, each shift register stage 11 providing ½-symbol period of delay. The function of the multiplying digital-to-analog converters 12 is implemented using double balanced push-pull analog multipliers 21, which are fed data bits and tap weights suitably scaled, depending on whether the data bit is HSB, MSB, or LSB, as discussed above.

Figure 4:
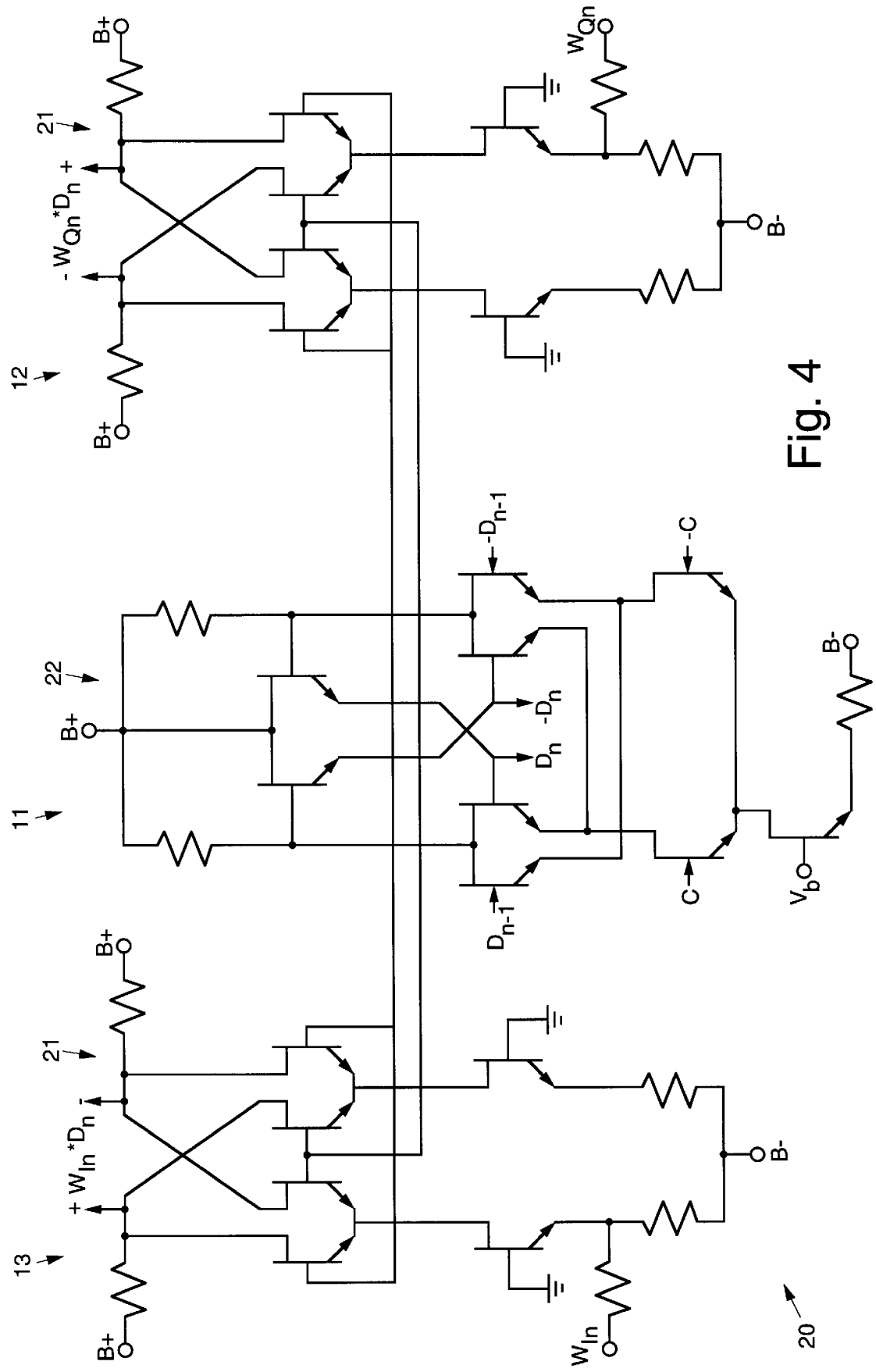
FIG. 4 illustrates an exemplary GaAs Heterojunction Bipolar Transistor (GaAs HBT) implementation of the nth shift register stage and associated Gilbert cell multipliers used in the programmable transmitter baseband equalizer shown in FIG. 3.

FIG. 4 shows a GaAs HBT Gilbert cell implementation of a typical shift register stage 11 and its two associated digital-to-analog converters 12, 13. The shift register stage 11 is implemented as a Gilbert cell 22 while the digital-to-analog converters 12 are implemented as multipliers 21. The shift register stage 11 shown in FIG. 4 should be well understood by those skilled in the art and will not be described in detail. However, for completeness, the signal $D_n$ is the data bit of the nth shift register stage 11, C is the input data clock, the signals W are the tap weights, and B+ and B− are bias voltages.

The programmable transmitter baseband equalizer 10 has the following features and advantages. The equalizer 10 performs the functions of both a constellation shaper and a ½-symbol spaced transversal filter 20. The equalizer 10 provides for a ½-symbol spaced transversal filter 20 in contrast to conventional symbol spaced transversal filters.

The equalizer 10 may be used with simple modulations such as QPSK, SQPSK, and 8PSK, as well as higher order QAM modulations, The equalizer 10 may be quickly and remotely reprogrammed for a different modulation scheme or continually readjusted for changing conditions.

The equalizer 10 is an all-rate circuit since the clock of the incoming data sets the tap delays. The equalizer 10 can be used with an intermediate frequency or provide direct conversion to the transmit frequency.

The equalizer 10 may be implemented as a single-chip medium-scale GaAs MMIC. Two or more equalizer chips may be chained together to provide additional taps. Since the digital-to-analog converter grid spacing can be nonuniform, more constellations can be accommodated with fewer bits.

The bits of each digital-to-analog converter 12 can be individually adjusted to compensate for nonlinearities. The equalizer 10 uses simple linear multipliers 21, which do not need complex analog control circuits.

Thus, improved programmable transmitter baseband equalizers have been disclosed. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A programmable transmitter baseband equalizer comprising:

a ½-symbol spaced transversal filter comprising a plurality of pairs of I and Q n-bit wide shift register stages that respectively receive I and Q n-bit wide data streams and data symbols by way of an input data clock, and wherein alternate pairs of I and Q shift register stages are driven by opposite phases of the input data clock;

a plurality of pairs of multiplying digital-to-analog converters coupled to outputs of each of the I and Q shift register stages and which are driven by two direct tap weights and two cross tap weights;

I and Q combiners for generating I and Q baseband signals; and a quadrature modulator coupled to the I and Q combiners for generating intermediate frequency or radio frequency signals.

2. The equalizer recited in claim 1, which comprises a single-chip medium-scale GaAs monolithic microwave integrated circuit.

3. The equalizer recited in claim 1 wherein the tap weights are scaled such that the highest significant bit is given the full tap weight, the next bit is given a tap weight of ½ the full tap weight, and so forth for the remaining bits.

4. The equalizer recited in claim 1 wherein the n-bit wide shift register stages comprise a Gilbert cell and the digital-to-analog converters comprise multipliers.

5. The equalizer recited in claim 1 wherein the quadrature modulator provides a QPSK output.

6. The equalizer recited in claim 1 wherein the quadrature modulator provides an SQPSK output.

7. The equalizer recited in claim 1 wherein the quadrature modulator provides an 8PSK output.

8. The equalizer recited in claim 1 wherein the quadrature modulator provides a QAM output.

9. The equalizer recited in claim 1 wherein the baseband signals directly feed baseband transmission channels.

10. The equalizer recited in claim 1 wherein the baseband signals directly generate or modulate optical signals.

11. The equalizer recited in claim 1 wherein the baseband signals directly modulate optical signals.

* * * * *